(12) United States Patent
Kodaira et al.

(10) Patent No.: US 8,747,983 B2
(45) Date of Patent: Jun. 10, 2014

(54) OPTICAL RECORDING MEDIUM

(71) Applicant: Taiyo Yuden Co., Ltd., Tokyo (JP)

(72) Inventors: Takuo Kodaira, Takasaki (JP); Akihisa Endo, Takasaki (JP); Kazunobu Takeguchi, Takasaki (JP); Fuyuki Miyazawa, Takasaki (JP); Shinichi Kojo, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/748,386

(22) Filed: Jan. 23, 2013

(65) Prior Publication Data

US 2013/0189543 A1 Jul. 25, 2013

(30) Foreign Application Priority Data

Jan. 24, 2012 (JP) ................................. 2012-012360

(51) Int. Cl.
*G11B 7/24* (2013.01)
(52) U.S. Cl.
USPC ... 428/64.1; 428/64.4; 428/64.8; 430/270.14; 430/270.16
(58) Field of Classification Search
USPC ..................... 428/64.8; 430/270.16
See application file for complete search history.

(56) References Cited

U.S. PATENT DOCUMENTS

| 2008/0081285 A1* | 4/2008 | Watanabe et al. ........ 430/270.16 |
| 2009/0252013 A1 | 10/2009 | Nakamura et al. |
| 2010/0002569 A1* | 1/2010 | Nagase et al. ............. 369/275.4 |
| 2011/0129635 A1 | 6/2011 | Kodaira et al. |
| 2011/0202942 A1* | 8/2011 | Fujimoto et al. ............. 720/718 |
| 2011/0244164 A1 | 10/2011 | Somei et al. |

FOREIGN PATENT DOCUMENTS

| EP | 1903561 A1 | 3/2008 |
| EP | 1967378 A1 | 9/2008 |
| JP | 2007-045147 A | 2/2007 |
| JP | 2007-196661 A | 8/2007 |
| JP | 2010-033639 A | 2/2010 |
| JP | 2010-143184 A | 7/2010 |
| TW | 200817326 A | 4/2008 |

* cited by examiner

*Primary Examiner* — Elizabeth Mulvaney
(74) *Attorney, Agent, or Firm* — Law Office of Katsuhiro Arai

(57) ABSTRACT

An object of the present invention is to provide a recordable optical recording medium whose characteristics do not deteriorate when recording is conducted in a high-temperature environment. The present invention provides a recordable optical recording medium comprising a substrate as well as at least a reflection layer, recording layer, and light transmission layer provided on the substrate, wherein the recording layer of said optical recording medium contains (a) an azo metal complex dye and (b) another dye whose decomposition temperature is 240° C. to 360° C.

13 Claims, 1 Drawing Sheet

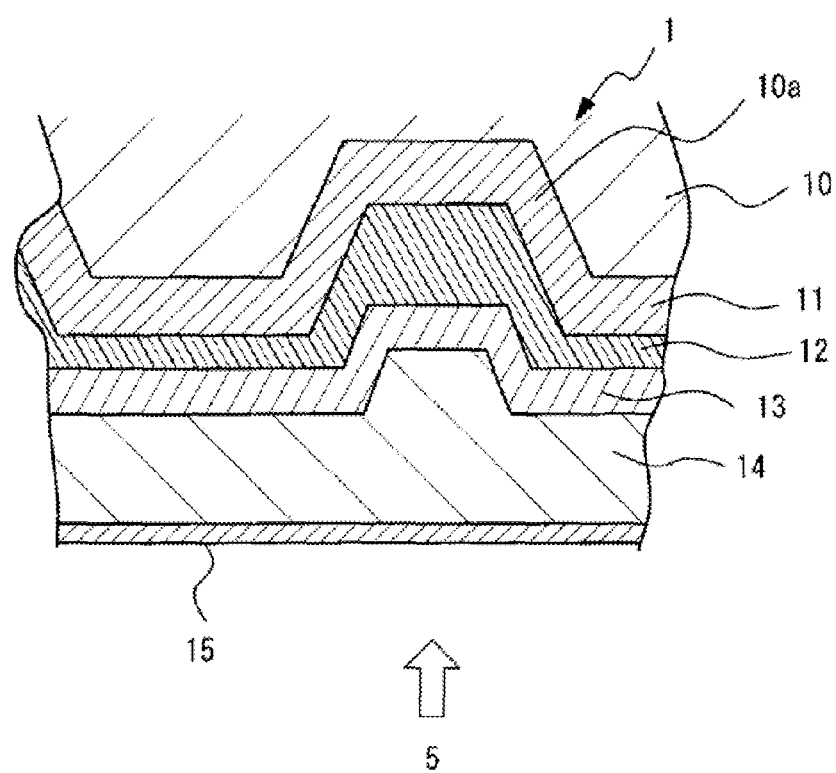

OPTICAL RECORDING MEDIUM

BACKGROUND

1. Field of the Invention

The present invention relates to a recordable optical recording medium of LTH (Low to High) recording type, having a recording layer that contains organic dye and capable of recording and playing back data using light of 300 nm to 500 nm in wavelength. To be specific, the present invention relates to a recordable optical recording medium of LTH (Low to High) recording type, having a recording layer that contains organic dye and being capable of recording and playing back data using light of 300 nm to 500 nm in wavelength, wherein said recordable optical recording medium permits a light transmission layer of one-layer configuration and whose characteristics do not deteriorate when recording is conducted in a high-temperature environment.

2. Description of the Related Art

LTH-type BD-R discs with a conventional recording layer that uses organic dye material have a cover layer of two-layer structure (the number of layers excludes a hardcoat layer). One of these layers is a cover layer made of hard material to resist scratching, as with HTL-type BD-R discs whose recording layer uses inorganic material; while the other layer is a cover layer that uses soft (low in elastic modulus (20 MPa or less)) material (acrylic resin or pressure-sensitive adhesive) for the purpose of accepting deformation caused by heat generation and expansion of dye when recording is conducted, maintaining a deformed state, and ensuring sufficient characteristics with Δnd. To realize low-cost organic BD-Rs, however, it is desirable to have a cover layer of one-layer configuration made of hard material, as with inorganic BD-Rs. An azo metal complex having a specific molecular structure is proposed as an organic dye material for recordable optical recording media having such cover layer of one-layer configuration (Japanese Patent Laid-open No. 2010-33639 and Japanese Patent Laid-open No. 2010-143184). One feature of this dye is that it is subject to less deformation when recording is conducted and consequently achieves a cover layer of one-layer configuration. However, a slight deformation still occurs during recording even when this dye is used. Since the cover layer is hard, deformation that occurs during recording is not local deformation of the recording pit, but it covers a wide range including the land and even adjacent pits. When recording is conducted in a high-temperature environment, the elastic modulus of the cover layer drops and therefore the amount of deformation increases, which causes a layer separation to occur easily. As explained above, it is difficult for the aforementioned recordable optical recording medium of Blu-ray Disc type, whose recording layer is formed using an azo metal complex of specific molecular structure and which has a light transmission layer (cover layer) of one-layer configuration, to fully absorb and accept deformation of the recording layer and adjacent layer when data is recorded in a high-temperature environment. This has been the cause of deteriorating recording and playback characteristics as the recording layer and adjacent layer separate partially due to the residual stress generated when the recording pit is formed.

PRIOR ART LITERATURES

Patent Literatures

[Patent Literature 1] Japanese Patent Laid-open No. 2010-33639

[Patent Literature 2] Japanese Patent Laid-open No. 2010-143184

SUMMARY

An object of the present invention is to provide a recordable optical recording medium whose characteristics do not deteriorate when recording is conducted in a high-temperature environment. A practical requirement for this, when considering the environment in the room where the recording/playback apparatus is to be installed and the rise in internal temperature due to operation of the recording/playback apparatus, is that layer separation does not occur even when recording is conducted at a laser power 30% greater than the laser power at which the R-SER value becomes the minimum in an environment of 55° C. (optimal recording power).

When data is recorded in a high-temperature environment, the dye layer, adjacent layer (protection layer), and cover layer deform due to excessive heat generation and decomposition of dye, especially when recording is conducted at a high laser power. After studying in earnest, the inventors found that, by mixing in a second dye having a high decomposition temperature, excessive decomposition of dye at a high laser power can be suppressed and deformation of the recording layer and adjacent layer can be reduced, thus preventing layer separation even when recording is conducted at a laser power 30% greater than the optimal recording power.

In other words, the present invention provides a recordable optical recording medium comprising a substrate as well as at least a reflection layer, recording layer, and light transmission layer provided on the substrate, wherein the recording layer of said optical recording medium contains (a) an azo metal complex dye and (b) another dye whose decomposition temperature is 240° C. to 360° C. In some embodiments, a dye comprises, consists essentially of, or consists of dyes (a) and (b), wherein dye (a) is a major dye, and dye (b) is a second major dye. In some embodiments, dye (a) has a decomposition temperature lower than 240° C. In some embodiments, dye (b) is an azo metal complex dye or alternatively a non-azo dye. Dye (a) and dye (b) may each be constituted by one or more dyes.

According to the present invention, a recordable optical recording medium can be provided, whose recording layer and adjacent layer do not undergo layer separation even when data is recorded in a high-temperature environment of 55° C. at a laser power 30% greater than the optimal recording power.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawing of a preferred embodiment which is intended to illustrate and not to limit the invention. The drawing is greatly simplified for illustrative purposes and is not necessarily to scale.

The FIGURE is a schematic longitudinal cross-section view of a recordable optical recording medium pertaining to a favorable embodiment of the present invention.

DETAILED DESCRIPTION OF EMBODIMENTS

The recordable optical recording medium proposed by the present invention comprises a substrate as well as at least a reflection layer, recording layer, and light transmission layer provided on the substrate, wherein the recording layer of said optical recording medium contains (a) an azo metal complex dye and (b) another dye whose decomposition temperature is 240° C. to 360° C.

The substrate functions as a support that ensures the mechanical strength required of an optical recording medium, being a disc of approx. 1.1 mm in thickness and 120 mm in diameter. The material with which to form the substrate is not limited in any way, as long as the mechanical strength required of an optical recording medium can be ensured, and examples include aluminum and other metals, glass, ceramics, resins, and the like. Among these, resins, especially thermoplastic resins, can be used favorably from the viewpoints of moldability, moisture resistance, dimensional stability, cost, etc. Examples of resins which form substrates include, among others, polycarbonate resins; polymethyl methacrylate and other acrylic resins; polyvinyl chloride, vinyl chloride copolymers and other vinyl chloride resins; epoxy resins; amorphous polyolefin resins; and polyester resins. Among these, polycarbonate resins are particularly preferred.

The reflection layer functions to reflect toward the recording layer the laser beam that has been irradiated onto the optical recording medium and transmitted through the recording layer, and is normally formed with Ag alloy, Al alloy or other metal of high reflectance. Examples of Ag alloy include AgPdCu, AgCuIn and AgBiNd, etc. Examples of Al alloy include AlNdTa, AlTi, etc. Preferably the reflection layer is formed with Ag alloy.

The recording layer is formed with an organic substance that contains organic dye. Preferably the (a) azo metal complex dye contained in the recording layer is an azo metal complex dye expressed by General Formula (1).

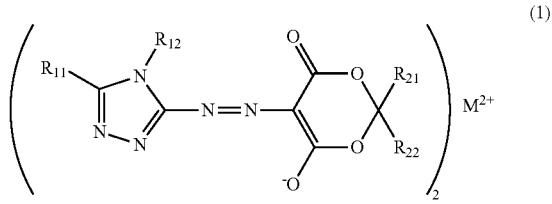

In General Formula (1), $R_{11}$ and $R_{12}$ are each an independent functional group selected from the group that includes a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms.

The alkyl group with 4 or less carbon atoms may be straight-chain or branched-chain alkyl or have a ring structure. Examples of the alkyl group with 4 or less carbon atoms include methyl group, ethyl group, n-propyl group, isopropyl group, n-butyl group, isobutyl group, sec-butyl group, t-butyl group, and the like.

Examples of the alkyl group with 4 or less carbon atoms being substituted by an aryl group with 6 to 10 carbon atoms include benzyl group, phenylethyl group, 1-naphthyl methyl group, and the like. The alkyl group may be straight-chain or branched-chain alkyl or have a ring structure.

The dialkyl amino group having identical or different alkyl groups with 4 or less carbon atoms may include dimethyl amino group, diethyl amino group, and the like. The alkyl group may be straight-chain or branched-chain alkyl or have a ring structure.

Examples of the halogen group include fluorine, chlorine, bromine, and the like.

Examples of the perfluoroalkyl group with 4 or less carbon atoms include trifluoromethyl group, pentafluoroethyl group, and the like. The alkyl group may be straight-chain or branched-chain alkyl or have a ring structure.

The alkoxy group with 4 or less carbon atoms may be straight-chain or branched-chain alkoxy or have a ring structure. Examples of the alkoxy group with 4 or less carbon atoms include methoxy group, ethoxy group, and the like.

Examples of the alkylthio group with 4 or less carbon atoms include methylthio group, ethyl thio group, and the like. The alkyl group may be straight-chain or branched-chain alkyl or have a ring structure.

Examples of the N,N-dialkyl carbamoyl group having identical or different alkyl groups with 4 or less carbon atoms include N,N-dimethyl carbamoyl group, N,N-diethyl carbamoyl group, and the like. The alkyl group may be straight-chain or branched-chain alkyl or have a ring structure.

In General Formula (1), $R_{21}$ and $R_{22}$ are each an independent alkyl group with 5 or less carbon atoms, or alternatively $R_{21}$ and $R_{22}$ can together form a 3 to 10-member ring.

Examples of the alkyl group with 5 or less carbon atoms include methyl group, ethyl group, n-propyl group, isopropyl group, n-butyl group, isobutyl group, sec-butyl group, t-butyl group, and the like. Examples of the ring formed by $R_{21}$ and $R_{22}$ together include cyclic alkyl group with 3 to 10 carbon atoms, and the like. Such cyclic group can have an alkyl group, carboxylic acid ethyl group, or other substitution group with 3 or less carbon atoms. Examples of the cyclic alkyl group with 3 to 10 carbon atoms include cyclohexyl group, adamantyl group, and the like.

In General Formula (1), M represents a metal atom selected from the group that includes nickel, cobalt and copper, and preferably nickel.

Specific examples of the chemical compound expressed by General Formula (1) include the chemical compounds shown below.

TABLE 1
| | Molecular structure |
|---|---|
| Chemical Formula 11 | 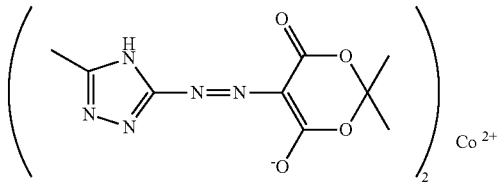 |
| Chemical Formula 12 | 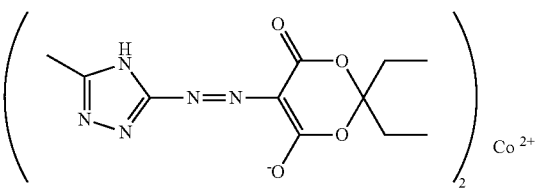 |
| Chemical Formula 13 | 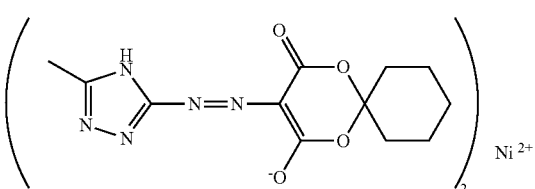 |
| Chemical Formula 14 | 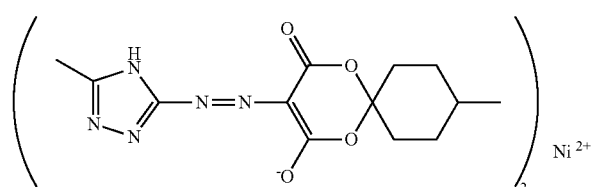 |
| Chemical Formula 15 | 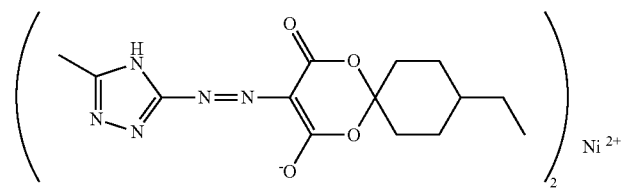 |
| Chemical Formula 16 | 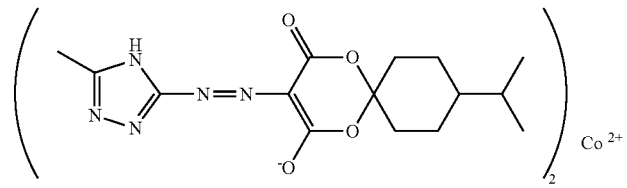 |
| Chemical Formula 17 | 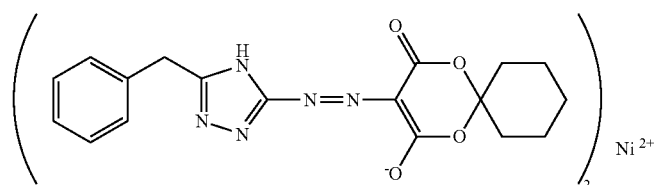 |
| Chemical Formula 18 | 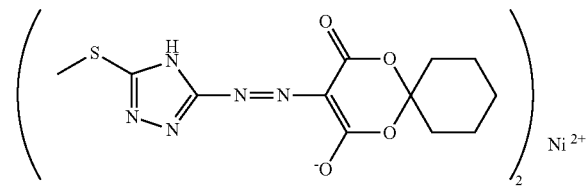 |

TABLE 1-continued

Molecular structure

Chemical Formula 19

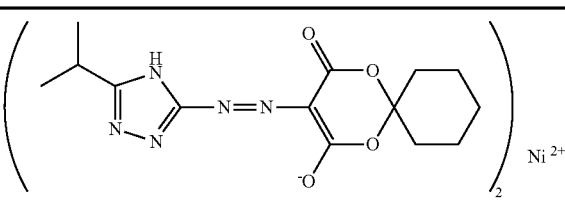

Chemical Formula 20

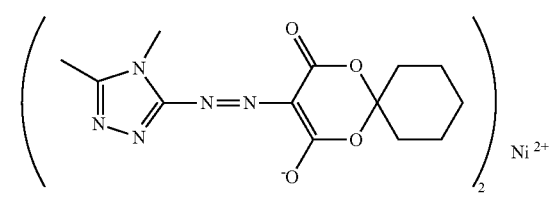

Chemical Formula 21

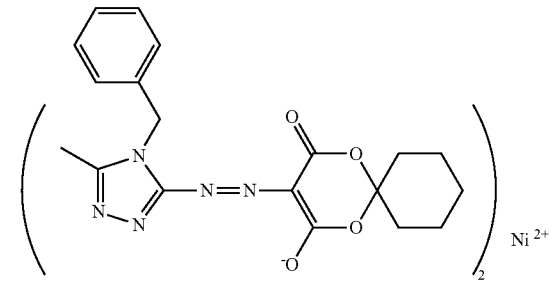

The decomposition temperature of dye (b) contained in the recording layer is 240° C. to 360° C., or preferably 250° C. to 310° C. The refractive index n of dye (b) is preferably 1.6 to 2.0, or more preferably 1.7 to 1.9. The absorption coefficient k of dye (b) is preferably 0.20 to 0.70, or more preferably 0.3 to 0.6. The λmax of dye (b) in TFP solution is preferably 250 to 400 nm, or more preferably 360 to 400 nm. Preferably dye (b) has optical properties equivalent to those of azo metal complex dye (a) so as not to impair the recording characteristics of azo metal complex dye (a). The content of dye (b) in the recording layer is preferably 10 to 40 percent by weight, or more preferably 15 to 30 percent by weight, relative to the weight of all organic dye in the recording layer.

For the material with which to form the light transmission layer, acrylic and other UV-hardening resins can be used, for example. Preferably the light transmission layer has a one-layer configuration. In addition, preferably the elastic modulus of the hardened light transmission layer at 25° C. is 40 MPa or more, but no more than 10000 MPa. The thickness of the light transmission layer is preferably 90 to 110 µm, or more preferably 95 to 105 µm. The light transmission rate of the light transmission layer, with respect to light of 405 nm in wavelength as measured by a spectrophotometer using light of 405 nm in wavelength, is preferably 70% or more, or more preferably 80% or more.

Preferably the recordable optical recording medium proposed by the present invention has a protection layer formed with dielectric material, between the recording layer and light transmission layer. When the light transmission layer is formed, the protection layer prevents the organic dye in the recording layer from diffusing to the light transmission layer, and also prevents mixing—a phenomenon of permeation into the recording layer of the solvent for photo-curing resin used when the light transmission layer is formed. The material with which to form the protection layer is not limited in any way, as long as it is transparent dielectric material, where examples include silicon oxide (silicon dioxide is particularly preferred), zinc oxide, cerium oxide, yttrium oxide, indium oxide-tin oxide (ITO), and other oxides; zinc sulfide, yttrium sulfide, and other sulfides; silicon nitride and other nitrides; silicon carbide; and a mixture of oxide and sulfur compound, and the like. The protection layer is formed by sputtering, etc. The thickness of the protection layer is preferably 10 to 30 nm, or more preferably 15 to 20 nm.

Preferably the recordable optical recording medium proposed by the present invention may have a hardcoat layer formed on the surface on the side opposite the one where the protection layer is formed. The hardcoat layer physically protects the light transmission layer and prevents the light transmission layer from being scratched. The material with which to form the hardcoat layer is not limited in any way, but materials offering excellent transparency and wear resistance are preferred. The hardcoat layer is formed by spin-coating a resin composition constituted by UV-hardening resin and inorganic grains added to it. The thickness of the hardcoat layer is preferably 1 to 5 µm, or more preferably 2 to 4 µm.

A recordable optical recording medium of LTH (Low to High) recording type, pertaining to a favorable embodiment of the present invention, is explained using the schematic longitudinal cross-section view in the FIGURE. The recordable optical recording medium 1 has a substrate 10, and a reflection layer 11, recording layer 12, protection layer 13, light transmission layer 14 of one-layer configuration having optical transparency, and hardcoat layer 15, are layered in this order on the substrate 10. The configuration is such that the recording laser beam 5 for recording data in the recording layer 12 of the optical recording medium 1, and playback laser beam 5 for playing back the data recorded in the recording layer 12, are irradiated onto the optical recording medium 1 through the surface of the hardcoat layer 15. Although not shown in the FIGURE, the recordable optical recording medium 1 has a disk shape and a center hole is formed at its center. Spiral guide grooves 10a are formed on the surface of the substrate 10. The spiral guide grooves 10a can be formed by, for example, injection-molding the substrate 10 using dies in which a stamper is set. The guide grooves 10a are formed at a pitch of 0.35 μm or 0.32 μm.

A reflection layer 11 is formed by means of sputtering, etc., on the surface of the substrate 10 on the side where the spiral guide grooves 10a are formed. A recording layer 12 is formed on the surface of the reflection layer 11. The recording layer 12 is formed by spin-coating the surface of the reflection layer 11 with an organic substance solution containing organic dye and then drying the solution. A protection layer 13 is formed on the surface of the recording layer 12. A light transmission layer 14 of one-layer configuration is formed on the surface of the protection layer 13. The light transmission layer 14 can be formed by, for example, spin-coating the surface of the protection layer 13 with a photo-curing resin solution that hardens when UV light or radiation is irradiated, and then irradiating UV light or radiation onto and thereby hardening the coating film thus formed. A hardcoat layer 15 that physically protects the light transmission layer 14 and prevents the light transmission layer 14 from being scratched, is formed on the surface of the light transmission layer 14.

When recording data to the optical recording medium 1 having such a configuration, a laser beam 5 having a wavelength of 300 nm to 500 nm, particularly around 400 nm (such as 405 nm), is irradiated from the hardcoat layer 15 side. The laser beam 5 transmits through the hardcoat layer 15, light transmission layer 14 of one-layer configuration, and protection layer 13, and enters the recording layer 12. Or, it transmits through the recording layer 12, reflects on the reflection layer 11, and enters the recording layer 12. This decomposes the organic dye contained in the area of the recording layer 12 irradiated by the laser beam 5, and as the reflectance of this area rises, a recording pit is formed and data is written to the optical recording medium 1.

EXAMPLES

Organic Dyes Used in Examples and Comparative Examples

The organic dyes used in Examples and Comparative Examples are shown in Tables 2 and 3 below.

TABLE 2

| Molecular structure | λ max (TFP solution) [nm] | n | k | Decomposition temperature [° C.] |
|---|---|---|---|---|
| Chemical Formula 31 | 398 | 1.72 | 0.38 | 304 |
| Chemical Formula 32 | 355 | 1.90 | 0.30 | 240 |
| Chemical Formula 33 | 398 | 1.61 | 0.37 | 242 |
| Chemical Formula 34 | 400 | 1.63 | 0.56 | 334 |

TABLE 2-continued
| | Molecular structure | λ max (TFP solution) [nm] | n | k | Decomposition temperature [° C.] |
|---|---|---|---|---|---|
| Chemical Formula 35 | 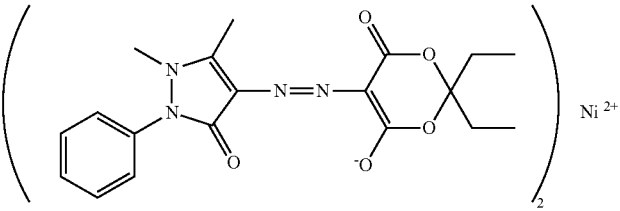 | 392 | 1.83 | 0.43 | 258 |
| Chemical Formula 36 | 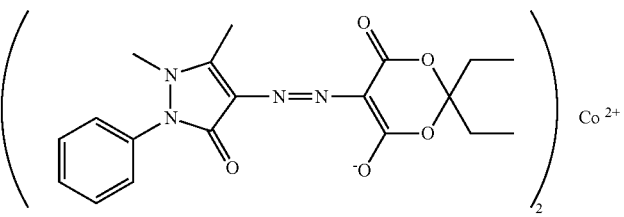 | 380 | 1.84 | 0.33 | 252 |
| Chemical Formula 37 | 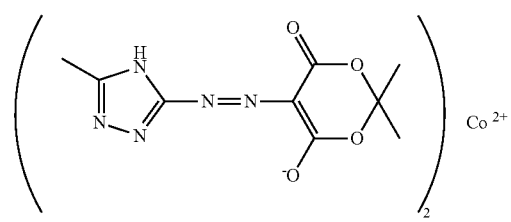 | 377 | 1.68 | 0.37 | 281 |
| Chemical Formula 38 | 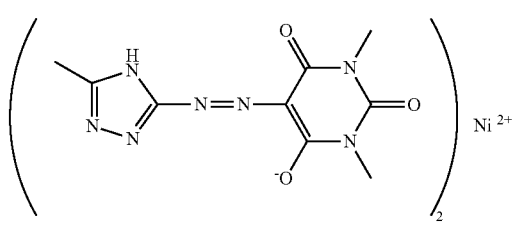 | 386 | 1.88 | 0.70 | 342 |
| Chemical Formula 39 | 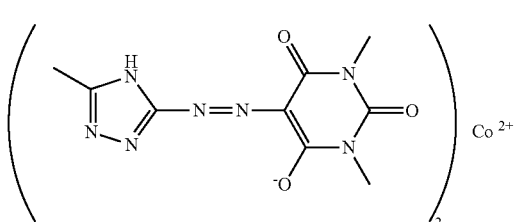 | 382 | 1.85 | 0.60 | 302 |
| Chemical Formula 40 | 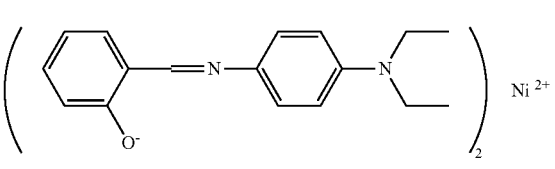 | 251 | 1.69 | 0.24 | 241 |
| Chemical Formula 41 | 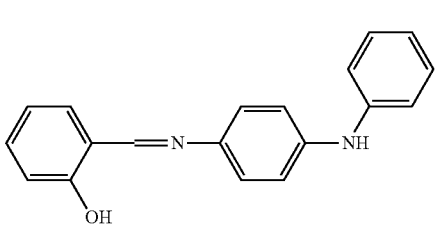 [SMILES: Oc1ccccc1C=Nc1ccc(Nc2ccccc2)cc1] | 372 | 1.72 | 0.20 | 327 |

TABLE 2-continued

| Molecular structure | λ max (TFP solution) [nm] | n | k | Decomposition temperature [° C.] |
|---|---|---|---|---|
| Chemical Formula 42 | 387 | 1.83 | 0.24 | 338 |
| Chemical Formula 43 | 379 | 1.78 | 0.21 | 351 |

TABLE 3

| Molecular structure | λ max (TFP solution) [nm] | n | k | Decomposition temperature [° C.] |
|---|---|---|---|---|
| Chemical Formula 51 | 435 | 1.4 | 0.45 | 305 |
| Chemical Formula 52 | 406 | 1.53 | 0.61 | 358 |
| Chemical Formula 53 | 411 | 1.7 | 0.58 | 327 |
| Chemical Formula 54 | 378 | 1.88 | 0.38 | 228 |

TABLE 3-continued

| Molecular structure | λ max (TFP solution) [nm] | n | k | Decomposition temperature [° C.] |
|---|---|---|---|---|
| Chemical Formula 55 | 414 | 1.48 | 0.44 | 364 |
| Chemical Formula 56 | 336 | 1.7 | 0.02 | 262 |
| Chemical Formula 57 | 432 | 1.28 | 0.41 | 276 |

(Measurement Method of λ max (TFP Solution))

A solution containing each dye dissolved in 2,2,3,3-tetrafluoro-1-propanol (TFP) to a concentration of approx. 30 μmol/L was prepared. This dye solution was put in a cell of 1 cm in optical path length and measured using the spectrophotometer "U-4100" (brand name) manufactured by Hitachi High Technologies.

(Measurement Method of Refractive Index n and Absorption Coefficient k)

Each dye solution using TFP as the dissolving medium was spin-coated onto the top side of a disk-shaped polycarbonate substrate of 120 mm in outer diameter and 0.6 mm in thickness, being flat on both sides, after which the solution was dried at a temperature of 80° C. for 30 minutes to form a thin dye film of approx. 40 nm in film thickness, and then measurement was performed to obtain values of refractive index n and absorption coefficient k for 405 nm wavelength using "ETA-RT/UV" (brand name) manufactured by STEAG ETA Optik GmbH.

(Measurement Method of Decomposition Temperature)

Measurement was performed using the TG-DTA (Thermogravimetry-Differential Thermal Analysis) method. To be specific, approx. 3 mg of each organic dye, as weighed on a precision scale, was put in a platinum pan and used as a sample. Similarly, approx. 3 mg of alumina ($Al_2O_3$), as weighed on a precision scale, was put in a platinum pan and used as a reference. Nitrogen gas was introduced at a flow rate of 200 ml per minute, and the sample and reference were heated in this ambience at a rate of temperature rise of 10° C. per minute, to obtain the TG using the thermogravimetry differential thermal analyzer "TGDTA-2000SR" (brand name) manufactured by Bruker AXS. The TG curve was differentiated (by dividing the change in weight by the change in temperature) and the temperature corresponding to the peak of the obtained DTG curve was taken as the decomposition temperature.

Example 1

A disk-shaped polycarbonate resin substrate of 120 mm in outer diameter and 1.1 mm in thickness, having spiral guide grooves formed on the surface at a pitch of 0.32 μm, was prepared by injection molding. On the substrate surface on the side where the guide grooves were formed, a reflection layer constituted by Ag alloy (In ratio: 0.2 percent by weight) was formed to a thickness of 60 nm by means of sputtering. On the surface of the reflection layer, tracks of 35 nm in depth and 140 nm in width, corresponding to the guide grooves, were formed.

Next, 80 percent by weight of azo metal complex dye (main dye: Chemical Formula II) and 20 percent by weight of organic dye (additive dye: Chemical Formula 31) were mixed, and the mixture was dissolved in 2,2,3,3-tetrafluoro-1-propanol (TFP) to prepare an organic dye solution. The obtained organic dye solution was spin-coated onto the surface of the reflection layer to form a coating film, and the coating film was dried at a temperature of 80° C. for 10 minutes to form a recording layer whose optical density (OD value) would become 0.24 at the maximum absorption wavelength (λ max=370 nm). The OD value indicates the optical density of the recording layer formed directly on the substrate, without forming the reflection layer, based on the OD value of the substrate alone being 0.

Furthermore, a protection layer constituted by indium oxide-tin oxide (ITO) was formed on the surface of the recording layer, to a thickness of 20 nm, by means of sputtering.

Next, acrylic UV-hardening resin was spin-coated onto the surface of the protection layer to form a coating film, after which UV light was irradiated to harden the coating film to form a light transmission layer of one-layer configuration having a thickness of 97 μm. The elastic modulus of the hardened light transmission layer at 25° C. was 620 MPa. Elastic modulus was measured using the dynamic visco-elasticity measuring apparatus RMAIII manufactured by TA Instruments. The sample resin was coated onto a disc to 100 μm and then hardened, after which the resin was separated from the disc and cut into a size of 5 mm×50 mm to obtain a test piece.

Then a resin composition constituted by UV-hardening resin with fine inorganic grains added to it, was spin-coated onto the surface of the light transmission layer to form a coating film. UV light was then irradiated onto the coating film to harden the coating film, to form a hardcoat layer of 3 μm in thickness. A sample optical recording medium was thus prepared.

Next, the obtained sample optical recording medium was set on the data recording/playback apparatus "ODU-1000" (brand name) manufactured by Pulstec in an environment of 55° C. While turning the disc at a line speed of 19.67 msec (quad-speed recording), a laser beam of 405 nm in wavelength was irradiated onto the recording layer through the light transmission layer using an objective lens with an NA of 0.85, while changing the power of the laser beam, to record data. The data thus recorded in the sample optical recording medium was played back using the aforementioned data recording/playback apparatus and when the playback characteristics were evaluated, the optimal recording power (optimal Pw) of playback signals was 7.7 mW. The optimal Pw represents an average of lower-limit power and upper-limit power at an R-SER of $2.0 \times 10^{-3}$ or less.

Next, recording was conducted in an environment of 55° C., to a position of 40 mm to 41 mm in radius, at a line speed of 19.67 msec and laser power 30% greater than the optimal laser power (=10.0 mW). As a result, no part of the recording area was separated.

Examples 2 to 32 and Comparative Examples 1 to 30

Sample optical recording media were prepared in the same manner as in Example 1, except that the type of dye and mixing ratio were changed as shown in Tables 4 and 5, and evaluated. The evaluation results are shown in Tables 4 and 5.

TABLE 4

|  | Main dye | Additive dye | Additive ratio [%] | Optimal Pw [mW] | Separation at optimal Pw × 1.3 |
| --- | --- | --- | --- | --- | --- |
| Example 1 | Chemical Formula 11 | Chemical Formula 31 | 20 | 7.7 | None |
| Example 2 | Chemical Formula 11 | Chemical Formula 32 | 20 | 8.0 | None |
| Example 3 | Chemical Formula 11 | Chemical Formula 33 | 20 | 7.6 | None |
| Example 4 | Chemical Formula 11 | Chemical Formula 34 | 20 | 7.8 | None |
| Example 5 | Chemical Formula 11 | Chemical Formula 35 | 20 | 7.7 | None |
| Example 6 | Chemical Formula 11 | Chemical Formula 36 | 20 | 7.8 | None |
| Example 7 | Chemical Formula 11 | Chemical Formula 37 | 20 | 8.0 | None |
| Example 8 | Chemical Formula 11 | Chemical Formula 38 | 20 | 7.4 | None |
| Example 9 | Chemical Formula 11 | Chemical Formula 39 | 20 | 7.4 | None |
| Example 10 | Chemical Formula 11 | Chemical Formula 40 | 20 | 7.9 | None |
| Example 11 | Chemical Formula 11 | Chemical Formula 41 | 20 | 8.0 | None |
| Example 12 | Chemical Formula 11 | Chemical Formula 42 | 20 | 7.8 | None |
| Example 13 | Chemical Formula 11 | Chemical Formula 43 | 20 | 7.8 | None |
| Example 14 | Chemical Formula 11 | Chemical Formula 31 | 10 | 7.8 | None |
| Example 15 | Chemical Formula 11 | Chemical Formula 31 | 40 | 7.5 | None |
| Example 16 | Chemical Formula 12 | Chemical Formula 31 | 20 | 7.7 | None |
| Example 17 | Chemical Formula 13 | Chemical Formula 31 | 20 | 7.8 | None |
| Example 18 | Chemical Formula 14 | Chemical Formula 31 | 20 | 7.8 | None |
| Example 19 | Chemical Formula 15 | Chemical Formula 31 | 20 | 7.8 | None |
| Example 20 | Chemical Formula 16 | Chemical Formula 31 | 20 | 7.6 | None |
| Example 21 | Chemical Formula 17 | Chemical Formula 31 | 20 | 7.7 | None |
| Example 22 | Chemical Formula 18 | Chemical Formula 31 | 20 | 7.5 | None |
| Example 23 | Chemical Formula 19 | Chemical Formula 31 | 20 | 7.6 | None |
| Example 24 | Chemical Formula 20 | Chemical Formula 31 | 20 | 7.8 | None |
| Example 25 | Chemical Formula 21 | Chemical Formula 31 | 20 | 7.8 | None |
| Example 26 | Chemical Formula 13 | Chemical Formula 32 | 20 | 7.9 | None |
| Example 27 | Chemical Formula 15 | Chemical Formula 34 | 20 | 7.8 | None |
| Example 28 | Chemical Formula 17 | Chemical Formula 36 | 20 | 7.8 | None |
| Example 29 | Chemical Formula 18 | Chemical Formula 39 | 20 | 7.5 | None |
| Example 30 | Chemical Formula 19 | Chemical Formula 40 | 20 | 7.8 | None |
| Example 31 | Chemical Formula 20 | Chemical Formula 41 | 20 | 7.9 | None |
| Example 32 | Chemical Formula 21 | Chemical Formula 42 | 20 | 7.8 | None |

TABLE 5

|  | Main dye | Additive dye | Additive ratio [%] | Optimal Pw [mW] | Separation at optimal Pw × 1.3 |
| --- | --- | --- | --- | --- | --- |
| Comparative Example 1 | Chemical Formula 11 | — | — | 8.1 | Occurred. |
| Comparative Example 2 | Chemical Formula 12 | — | — | 8.2 | Occurred. |
| Comparative Example 3 | Chemical Formula 13 | — | — | 8.2 | Occurred. |
| Comparative Example 4 | Chemical Formula 14 | — | — | 8.3 | Occurred. |
| Comparative Example 5 | Chemical Formula 15 | — | — | 8.2 | Occurred. |
| Comparative Example 6 | Chemical Formula 16 | — | — | 8.0 | Occurred. |
| Comparative Example 7 | Chemical Formula 17 | — | — | 8.1 | Occurred. |
| Comparative Example 8 | Chemical Formula 18 | — | — | 8.0 | Occurred. |
| Comparative Example 9 | Chemical Formula 19 | — | — | 8.0 | Occurred. |
| Comparative Example 10 | Chemical Formula 20 | — | — | 8.2 | Occurred. |
| Comparative Example 11 | Chemical Formula 21 | — | — | 8.2 | Occurred. |
| Comparative Example 12 | Chemical Formula 13 | — | — | 8.3 | Occurred. |
| Comparative Example 13 | Chemical Formula 15 | — | — | 8.2 | Occurred. |
| Comparative Example 14 | Chemical Formula 17 | — | — | 8.0 | Occurred. |
| Comparative Example 15 | Chemical Formula 18 | — | — | 8.0 | Occurred. |
| Comparative Example 16 | Chemical Formula 19 | — | — | 8.2 | Occurred. |

TABLE 5-continued

| | Main dye | Additive dye | Additive ratio [%] | Optimal Pw [mW] | Separation at optimal Pw × 1.3 |
|---|---|---|---|---|---|
| Comparative Example 17 | Chemical Formula 20 | — | — | 8.3 | Occurred. |
| Comparative Example 18 | Chemical Formula 21 | — | — | 8.3 | Occurred. |
| Comparative Example 19 | Chemical Formula 11 | Chemical Formula 31 | 5 | 8.2 | Occurred. |
| Comparative Example 20 | Chemical Formula 11 | Chemical Formula 51 | 20 | 8.5 | Occurred. |
| Comparative Example 21 | Chemical Formula 11 | Chemical Formula 52 | 20 | 8.6 | Occurred. |
| Comparative Example 22 | Chemical Formula 11 | Chemical Formula 53 | 20 | 8.0 | Occurred. |
| Comparative Example 23 | Chemical Formula 11 | Chemical Formula 54 | 20 | 8.2 | Occurred. |
| Comparative Example 24 | Chemical Formula 11 | Chemical Formula 55 | 20 | 8.4 | Occurred. |
| Comparative Example 25 | Chemical Formula 11 | Chemical Formula 56 | 20 | 8.6 | Occurred. |
| Comparative Example 26 | Chemical Formula 11 | Chemical Formula 57 | 20 | 8.5 | Occurred. |
| Comparative Example 27 | Chemical Formula 17 | Chemical Formula 52 | 20 | 8.4 | Occurred. |
| Comparative Example 28 | Chemical Formula 21 | Chemical Formula 52 | 20 | 8.4 | Occurred. |
| Comparative Example 29 | Chemical Formula 13 | Chemical Formula 54 | 20 | 8.2 | Occurred. |
| Comparative Example 30 | Chemical Formula 20 | Chemical Formula 54 | 20 | 8.1 | Occurred. |

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-012360, filed Jan. 24, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An optical recording medium comprising a substrate as well as at least a reflection layer, recording layer, and light transmission layer provided on the substrate, wherein the recording layer of said optical recording medium contains (a) an azo metal complex dye and (b) another dye whose decomposition temperature is 240° C to 360° C, wherein the λ max of dye (b) in TFP solution is 250 to 400 nm.

2. An optical recording medium according to claim 1, wherein the refractive index (n) and absorption coefficient (k) of dye (b) are 1.6 to 2.0 and 0.20 to 0.70, respectively, for 405 nm wavelength.

3. An optical recording medium according to claim 1, wherein dye (a) is an azo metal complex dye expressed by General Formula (1):

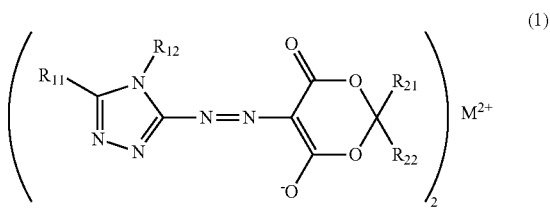

wherein $R_{11}$ and $R_{12}$ are each an independent functional group selected from the group consisting of a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms; $R_{21}$ and $R_{22}$ are each an independent alkyl group with 5 or less carbon atoms, or alternatively $R_{21}$ and $R_{22}$ can together form a 3 to 10-member ring; M represents a metal atom selected from the group consisting of nickel, cobalt and copper.

4. An optical recording medium according to claim 2, wherein dye (a) is an azo metal complex dye expressed by General Formula (1):

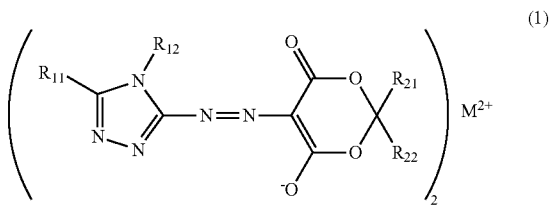

wherein $R_{11}$ and $R_{12}$ are each an independent functional group selected from the group consisting of a hydrogen atom; alkyl group with 4 or less carbon atoms; alkyl group with 4 or less carbon atoms being substituted by an aryl group with 6 to 10 carbon atoms; dialkyl amino group having identical or different alkyl groups with 4 or less carbon atoms; halogen group; perfluoroalkyl group with 4 or less carbon atoms; alkoxy group with 4 or less carbon atoms; alkylthio group with 4 or less carbon atoms; and N,N-dialkyl carbamoyl group having identical or different alkyl groups with 4 or less carbon atoms; $R_{21}$ and $R_{22}$ are each an independent alkyl group with 5 or less carbon atoms, or alternatively $R_{21}$ and $R_{22}$ can together form a 3 to 10-member ring; M represents a metal atom selected from the group consisting of nickel, cobalt and copper.

5. An optical recording medium according to claim 1, wherein the content of dye (b) in the recording layer is 10 to 40 percent by weight relative to the weight of all organic dye in the recording layer.

6. An optical recording medium according to claim 2, wherein the content of dye (b) in the recording layer is 10 to 40 percent by weight relative to the weight of all organic dye in the recording layer.

7. An optical recording medium according to claim 1, wherein the light transmission layer has a one-layer configuration.

8. An optical recording medium according to claim 2, wherein the light transmission layer has a one-layer configuration.

9. An optical recording medium according to claim 7, wherein the elastic modulus of the light transmission layer at 25° C. is 40 MPa or more, but no more than 10000 MPa.

10. An optical recording medium according to claim 8, wherein the elastic modulus of the light transmission layer at 25° C. is 40 MPa or more, but no more than 10000 MPa.

11. An optical recording medium according to claim 1, wherein a protection layer formed with dielectric material is provided between the recording layer and light transmission layer.

12. An optical recording medium according to claim 2, wherein a protection layer formed with dielectric material is provided between the recording layer and light transmission layer.

13. An optical recording medium according to claim 11, wherein a hardcoat layer is formed on the surface of the light transmission layer on the side opposite the one where the protection layer is formed.

* * * * *